United States Patent [19]

Takeuchi et al.

[11] Patent Number: 5,253,194
[45] Date of Patent: Oct. 12, 1993

[54] DIGITAL MULTIPLIER

[75] Inventors: Sumitaka Takeuchi; Keisuke Okada, both of Hyogo, Japan

[73] Assignee: Mitsubishi Denki Kabushiki Kaisha, Tokyo, Japan

[21] Appl. No.: 866,708

[22] Filed: Apr. 10, 1992

[30] Foreign Application Priority Data

Apr. 16, 1991 [JP] Japan .................................. 3-084192

[51] Int. Cl.⁵ .............................................. G06F 7/52
[52] U.S. Cl. ................................................ 364/757
[58] Field of Search .............................. 364/757–760, 364/754

[56] References Cited

U.S. PATENT DOCUMENTS

4,546,446 10/1985 Machida ............................. 364/757
4,831,577 5/1989 Wei et al. ........................... 364/757
5,070,471 12/1991 Dao-Trong et al. ................ 364/760

*Primary Examiner*—Long T. Nguyen
*Attorney, Agent, or Firm*—Lowe, Price, LeBlanc & Becker

[57] ABSTRACT

A decode circuit decodes digital signals X1 and X0 as multiplicand to output decoded signals A0–A3. One of these decoded signals A3–A0 is set to be logic 1 in accordance with a value of a multiplicand. A logical operation circuit includes a plurality of operation circuits. Each logical operation circuit performs an independent operation for obtaining a logical value of each bit of the digital signal which is a multiplication result, based on the decoded signals A0–A3 and the digital signals R1 and R0 as a multiplier. Therefore, a result of an operation of a certain bit does not affect results of operations of other bits, so that the logical operation of each bit can be conducted without waiting termination of the logical operations of other bits, which enables high-speed multiplications.

5 Claims, 10 Drawing Sheets

| MULTIPLIER | 0 | | | | 1 | | | | 2 | | | | 3 | | | |
|---|---|---|---|---|---|---|---|---|---|---|---|---|---|---|---|---|
| MULTIPLICAND | (R1,R0)=(0,0) | | | | (R1,R0)=(0,1) | | | | (R1,R0)=(1,0) | | | | (R1,R0)=(1,1) | | | |
| | A0=1 | A1=1 | A2=1 | A3=1 | A0=1 | A1=1 | A2=1 | A3=1 | A0=1 | A1=1 | A2=1 | A3=1 | A0=1 | A1=1 | A2=1 | A3=1 |
| Y3 | 0 | 0 | 0 | 0 | 0 | 0 | 0 | 1 | 0 | 0 | 1 | 0 | 0 | 0 | 1 | 1 |
| Y2 | 0 | 0 | 0 | 0 | 0 | 0 | 1 | 0 | 0 | 1 | 0 | 0 | 0 | 1 | 1 | 0 |
| Y1 | 0 | 0 | 0 | 0 | 0 | 1 | 0 | 0 | 1 | 0 | 0 | 0 | 1 | 1 | 0 | 0 |
| Y0 | 0 | 0 | 0 | 0 | 1 | 0 | 0 | 0 | 0 | 0 | 0 | 0 | 1 | 0 | 0 | 1 |

| R1 | R0 |
|----|----|
| 1  | 1  |

MULTIPLIER = 3

FIG. 8(b)

| S1 | S2 | S3 | S4 | S5 |
|----|----|----|----|----|
| 1  | 0  | 1  | 0  | 1  |

PARTIAL PRODUCT

FIG. 8(c)

| X1 | X0 |
|----|----|
| 1  | 0  |

MULTIPLICAND = 2

FIG. 8(d)

| A3 | A2 | A1 | A0 |
|----|----|----|----|
| 0  | 1  | 0  | 0  |

DECODE SIGNAL

FIG. 8(e)

| Y3 | Y2 | Y1 | Y0 |
|----|----|----|----|
| 0  | 1  | 1  | 0  |

PRODUCT 3 x 2 = 6

FIG. 9 PRIOR ART

FIG. 10          PRIOR ART $$\begin{array}{r}X_1 \quad X_0 \quad :\text{MULTIPLICAND} \\ \times) \quad R_1 \quad R_0 \quad :\text{MULTIPLIER} \\ \hline X_1 \cdot R_0 \quad X_0 \cdot R_0 \quad \\ +) \quad X_1 \cdot R_1 \quad X_0 \cdot R_1 \quad \\ \hline Y_3 \quad Y_2 \quad Y_1 \quad Y_0 \quad :\text{PRODUCT}\end{array}$$

DIGITAL MULTIPLIER

BACKGROUND OF THE INVENTION

1. Field of the Invention

The present invention relates to a digital multiplier, and particularly to a digital multiplier which multiplies a coded first digital signal by a coded second digital signal to output a coded third digital signal.

2. Description of the Background Art

Digital multipliers are fundamental circuits as amplifiers and attenuators are in analog circuits, and are widely used in digital signal processing circuits.

Figure 10:
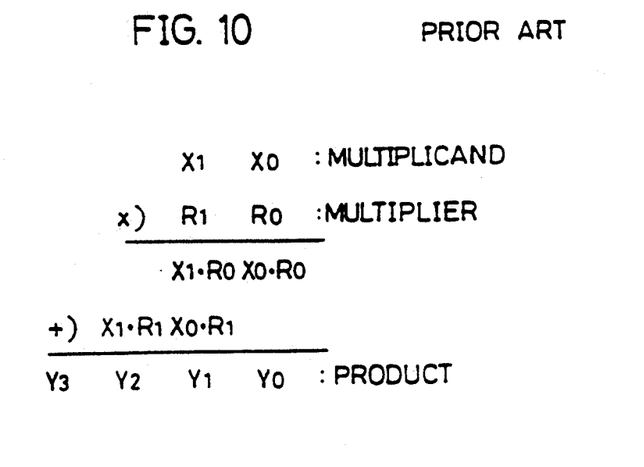
FIG. 10 shows, as an example, multiplication steps for the array type digital multiplier shown in FIG. 9.

Digital multiplication is basically performed as shown in FIG. 10, by repeating shifts and additions, as is done in calculation with figures of decimal numbers. Therefore, the conventional digital multipliers are formed of AND gates and full adders.

Figure 9:
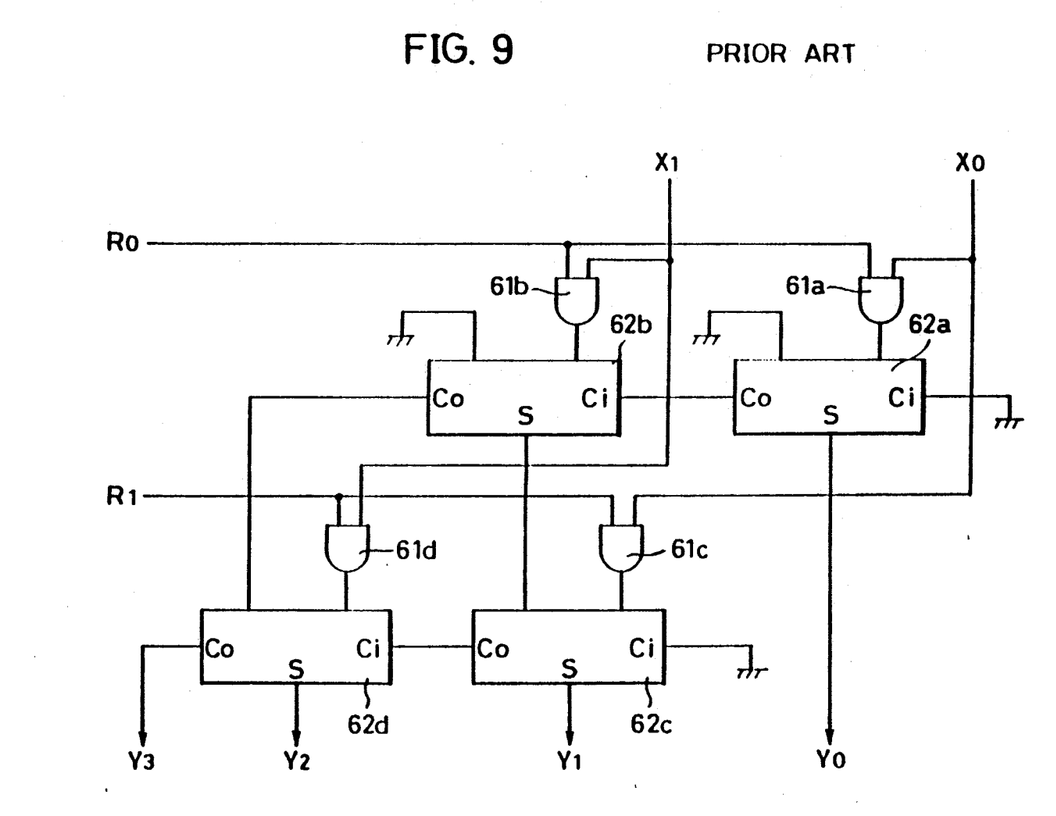
FIG. 9 is a block diagram showing an example of a construction of a conventional array type digital multiplier.

FIG. 9 is a block diagram showing an example of a construction of a conventional array type digital multiplier. Referring to the figure, the digital multiplier receives digital signals X1 and X0 of 2 bits as multiplicands and digital signals R1 and R0 of 2 bits as multipliers to output digital signals Y3–Y0 of 4 bits which are products of the digital signals X1 and X0 and the digital signals R1 and R0. The digital multiplier shown in FIG. 9 comprises AND gates $61a$–$61d$ and full adders $62a$–$62d$. Each full adder has a terminal Ci for receiving carry signals, a terminal Co for supplying the carry signals, a terminal S for supplying addition signals. The construction of the digital multiplier shown in FIG. 9 is extremely general and is well known to those skilled in the art, and thus specific structures and operations thereof will not be described.

In the digital multiplier shown in FIG. 9, a maximum propagation path for signals in which a propagation delay time of a signal becomes maximum is formed by a path extending through one AND gate and four full adders, i.e., a path from X0 through the AND gate $61a$, the full adder $62a$, the full adder $62b$, the full adder $62c$ and the full adder $62d$ to Y3. Generally, in a digital multiplier of an array type of n x n bits, signals must pass through at the most $(3n-2)$ unit circuits, which are formed of AND gates and full adders. Another prior art for increasing speed of signal propagation has employed an algorithm of Booth or a carry save method. In either case, since the digital multiplier is constructed using full adders, carry delay is caused, and a length of the maximum propagation path for signals increases as the bit number of the digital signal to be input increases.

Since the conventional digital multipliers in which the digital signals are multiplied together are constructed using full adders as described above, there has been problems such as carry delay and increase of lengths of the maximum propagation paths for signals. These problems become more serious as the bit numbers of the supplied digital signals increase. Even if one of the supplied digital signals is set at a fixed value, this causes any change in the maximum propagation path for the signals in the conventional digital multiplier. In order to increase an operation speed of the digital multiplier, a pipeline construction may be employed. However, this causes other problems such as complicated construction of circuits and increase of a circuit area. The operation speed may be increased by using a ROM table in which all the multiplication results obtained by combination of multipliers and multiplicands are stored. However, in this construction, as the bit number of the supplied digital signals increases, the circuit area increases in a form of an exponential function, and a read speed decreases.

SUMMARY OF THE INVENTION

Accordingly, it is an object of the invention to provide a digital multiplier having small size and a high operation speed.

A digital multiplier according to the invention in which a coded first digital signal of multiple bits is multiplied by a coded second digital signal of multiple bits to output a coded third digital signal of multiple bits as a result of multiplication, comprises decoding means and logical operation means. The decoding means decodes the second digital signal. The logical operation means performs independent operations for obtaining logical values of respective bits of the third digital signal, based on the first digital signal and an output of the decoding means.

According to the invention, since the logical value of each bit of the third digital signal, which forms the result of multiplication, is obtained by the independent operation based on the first digital signal and the output of the decoding means, a result of a logical operation of a certain bit of the third digital signal does not affect the results of the logical operations of other bits. Therefore, the logical operation means can be constructed without using a full adder, and thus carry delay which may be caused in the conventional digital multipliers is not generated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8($a$)–8($e$) show, as an example, multiplication steps in an embodiment shown in FIG. 4;

DESCRIPTION OF THE PREFERRED EMBODIMENTS

Figure 1:
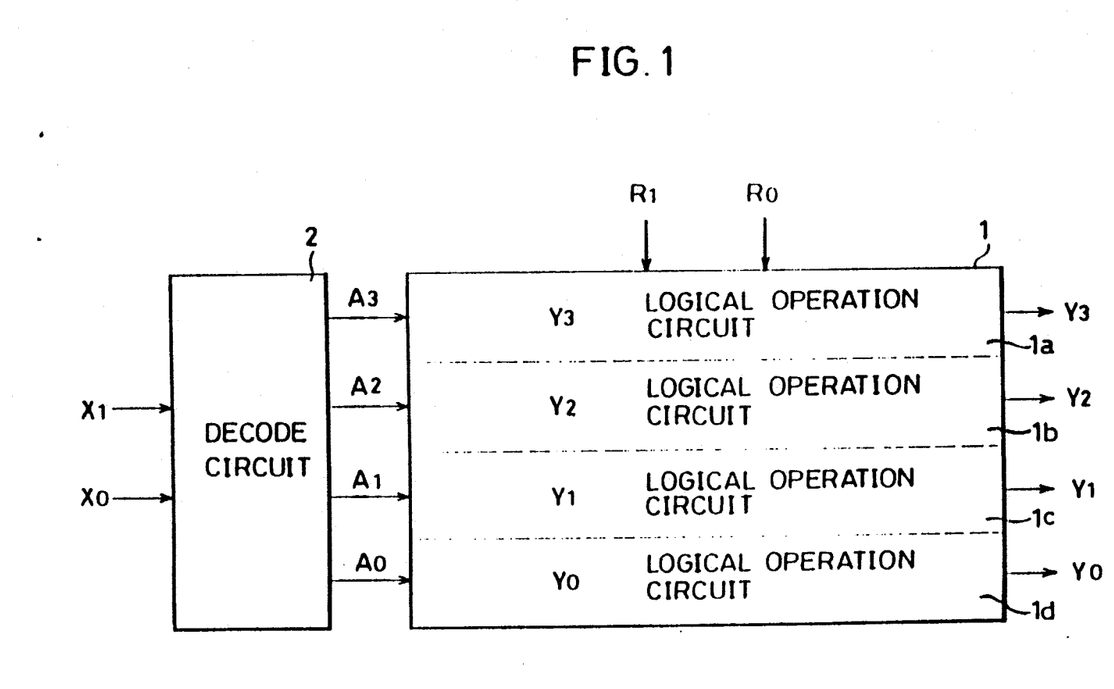
FIG. 1 is a schematic block diagram showing a construction of an embodiment of the invention.

FIG. 1 is a schematic block diagram showing a construction of a digital multiplier according to an embodiment of the invention. For simplifying description, a digital multiplier of 2×2 bits is shown in FIG. 1. Similarly to the digital multiplier shown in FIG. 9, the digital multiplier in FIG. 1 receives digital signals X1 and X0 of 2 bits as multiplicands and digital signals R1 and R0 of 2 bits as multipliers and outputs digital signals Y0-Y3 of 4 bits as results of the multiplication.

The digital multiplier shown in FIG. 1 comprises a logical operation circuit 1 and a decode circuit 2. The decode circuit 2 decodes a supplied digital signal of n-bits which is a multiplicand to output $2^n$ decoded signals. The decode circuit 2 shown in FIG. 1 decodes the digital signals X1 and X0 of 2 bits and outputs the decoded signals A3-A0 of 4 bits. The decoded signals A3-A0 correspond to values of the supplied digital signals of X1 and X0 and include only one decoded signal of logic 1 (e.g., at a high level) and other decoded signals of logic 0 (e.g., at a low level). The four decoded signals A3-A0 are supplied to the logical operation circuit 1. The logical operation circuit 1 further receives the digital signals R1 and R0 of 2 bits as multipliers. The logical operation circuit 1 includes operation circuits for respective bits of the digital signals Y3-Y0 as the multiplication results. Specifically, the logical operation circuit 1 comprises a Y3 operation circuit 1a, a Y2 operation circuit 1b, a Y1 operation circuit 1c and a Y0 operation circuit 1d. Therefore, the logical operation circuit 1 performs independent operations of the respective bits of the digital signals Y3-Y0 forming the multiplication result.

Figure 2:
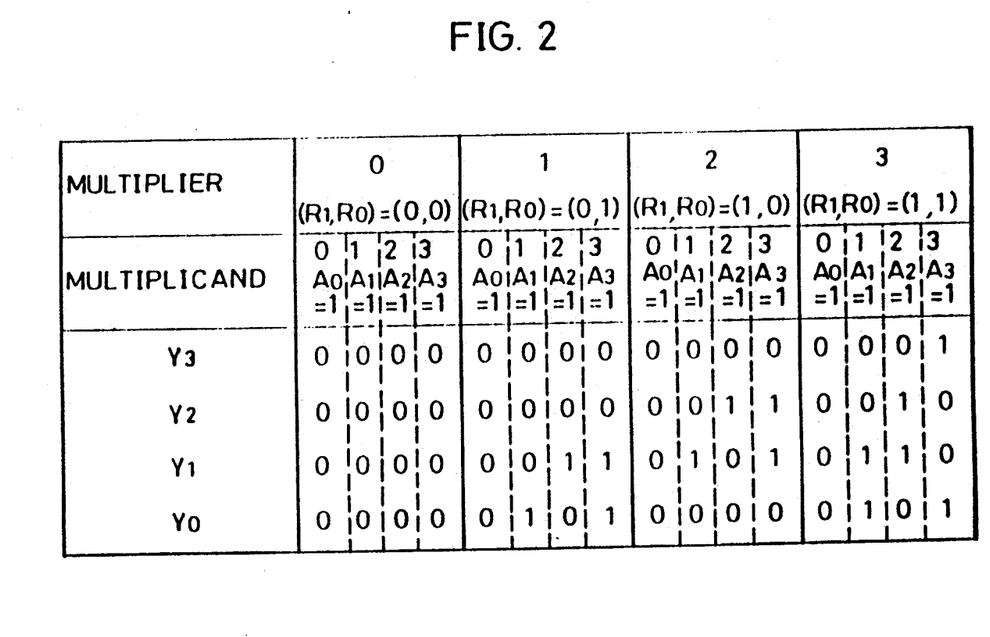
FIG. 2 shows a relationship between multipliers and multiplicands as well as multiplication results in an embodiment of the invention.
Figure 3:
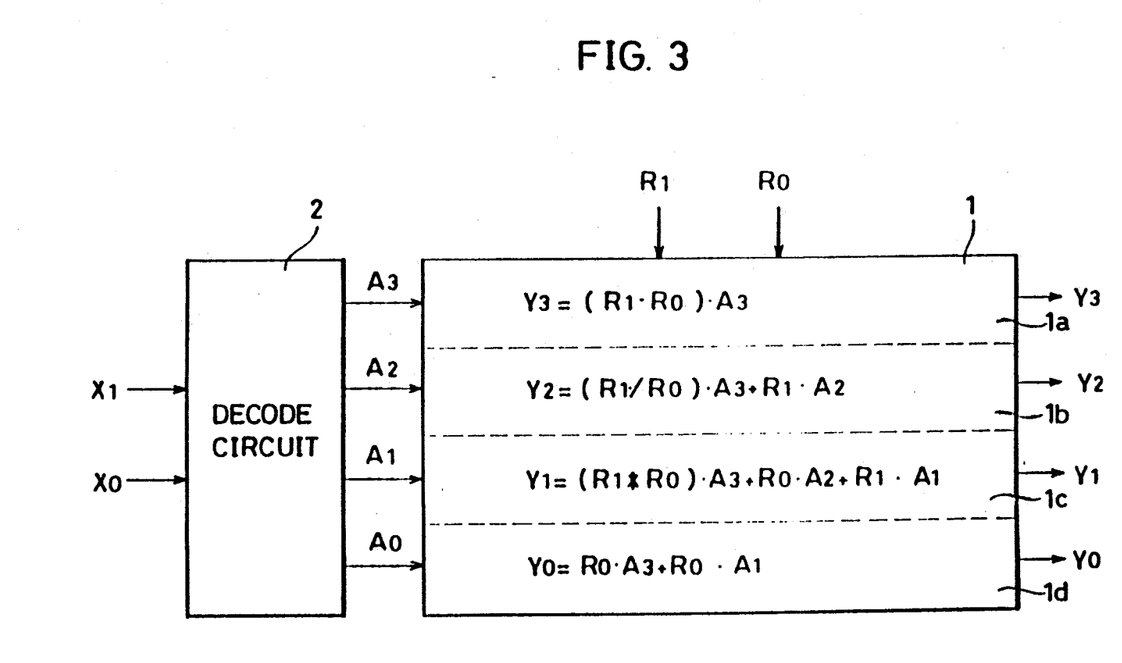
FIG. 3 shows operation contents of respective operation circuits $1a$–$1d$ in an embodiment shown in FIG. 1.

FIG. 2 shows a logical relationship between the multipliers and the multiplicands as well as the multiplication results, i.e., digital signals Y3-Y0 in the embodiment shown in FIG. 1. A logical operation of the embodiment shown in FIG. 1 will be described below with reference to FIG. 2.

In FIG. 2, multipliers are represented by the digital signals R1 and R0 of 2 bits, and the decimal numbers of 0, 1, 2 and 3 are represented by (R1, R0)=(0, 0), (R1, R0)=(0, 1), (R1, R0)=(1, 0) and (R1, R0)=(1, 1), respectively. On the other hand, multiplicands are represented by the decoded signals A0-A3 of the digital signals X1 and X0 of 2 bits, and the decimal numbers of 0, 1, 2 and 3 are represented by A0=1, A1=1, A2=1, A3=1, respectively. For example, if a value of the multiplicand is 2, only the decoded signal A2 attains logic 1 and others attain logic 0.

In FIG. 2, description will be made particularly with respect to a product in which the logic 1 is output. For example, in connection with the output signal Y2, the logic 1 is obtained in cases of 2×2, 2×3 and 3×2. These conditions are satisfied by the following logical expression:

$$Y2 = (R1 \cdot /R0) \cdot A2 + (R1 \cdot /R0) \cdot A3 + (R1 \cdot R0) \cdot A2$$
$$= (R1 \cdot /R0) \cdot A3 + (R1 \cdot /R0 + R1 \cdot R0) \cdot A2$$
$$= (R1 \cdot /R0) \cdot A3 + R1 \cdot A2$$

In the above expression, /R0 represents an inverted signal of the bit signal R0. A symbol "·" represents a logical product, and a symbol "+" represents a logical sum. For example, in a case of 2×3, in which R1=1, /R0=1, A3=1 and A0=A1=A2=0 are established, substitution of these parameters for items in the above expression results in Y2=(1·1)·1+1·0=1. Cases of 2×2 and 3×2 also result in Y2=1.

In a manner similar to the above, logical expressions of the respective bits Y3-Y0 of the multiplication results are described below.

$$Y3 = (R1 \cdot R0) \cdot A3 \qquad (1)$$

$$Y2 = (R1 \cdot /R0) \cdot A2 + (R1 \cdot /R0) \cdot A3 + (R1 \cdot R0) \cdot A2 \qquad (2)$$
$$= (R1 \cdot /R0) \cdot A3 + (R1 \cdot /R0 + R1 \cdot R0) \cdot A2$$
$$= (R1 \cdot /R0) \cdot A3 + R1 \cdot A2$$

$$Y1 = (/R1 \cdot R0) \cdot A2 + (/R1 \cdot R0) \cdot A3 + (R1 \cdot /R0) \cdot A1 + \qquad (3)$$
$$(R1 \cdot /R0) \cdot A3 + (R1 \cdot R0) \cdot A1 + (R1 \cdot R0) \cdot A2$$
$$= (/R1 \cdot R0 + R1 \cdot /R0) \cdot A3 + (/R1 \cdot R0 + R1 \cdot R0) \cdot A2 + (R1 \cdot /R0 + R1 \cdot R0) \cdot A1$$
$$= (R1*R0) \cdot A3 + R0 \cdot A2 + R1 \cdot A1$$

$$Y0 = (/R1 \cdot R0) \cdot A1 + (/R1 \cdot R0) \cdot A3 + (R1 \cdot R0) \cdot A1 + \qquad (4)$$
$$(R1 \cdot R0) \cdot A3$$
$$= (/R1 \cdot R0 + R1 \cdot R0) \cdot A3 + (/R1 \cdot R0 + R1 \cdot R0) \cdot A1$$
$$= R0 \cdot A3 + R0 \cdot A1$$

In the expressions (1)-(4), /R1 represents an inverted signal of the bit signal R1 of the multiplier and /R0 represents an inverted signal of the bit signal R0 of the multiplier. The symbol "*" indicates exclusive OR. As apparent from the above expressions (1)-(4), respective logical values of the respective bits of the digital signals Y3-Y0 forming the multiplication results can be independently operated based on the digital signals R1 and R0 forming the multipliers and the decoded signals A0-A3 forming the multiplicands. The operation circuits 1a-1d of FIG. 1 are constructed as circuits which independently perform logical operations represented by the above expressions (1)-(4), respectively.

In the embodiment shown in FIG. 1, since the logical values of the respective bits of the digital signals Y3-Y0 forming the multiplication result are operated independently from each other, an operation result of a certain bit does not affect operation results of other bits. Therefore, the logical operation of each bit can be executed without waiting termination of the logical operations of the remaining bits. Consequently, carry delay, which may be generated in the conventional digital multiplier using the full adders as shown in FIG. 9, is not generated, and therefore a high-speed logical operation of each bit is realized.

Figure 4:
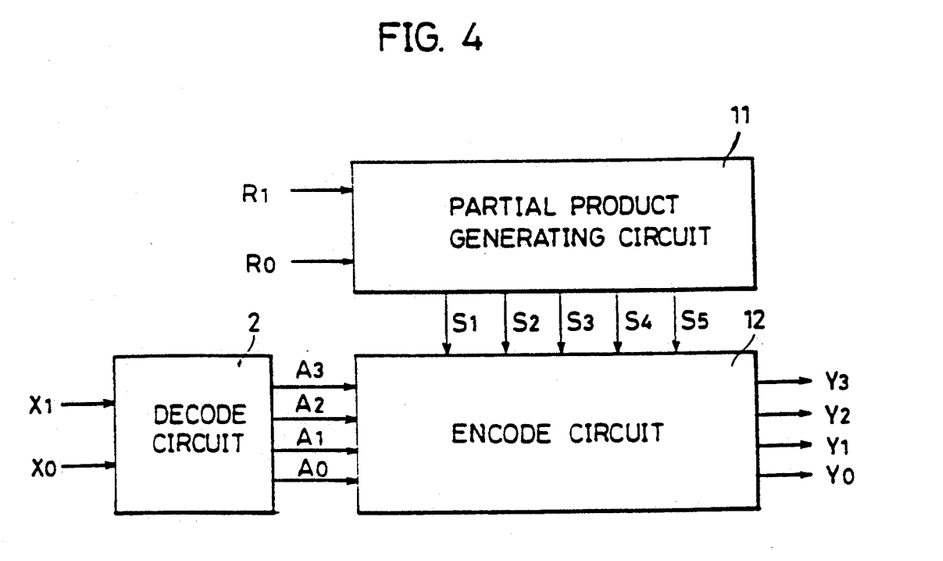
FIG. 4 is a block diagram showing an example of a specific construction of an embodiment shown in FIG. 1.

FIG. 4 is a block diagram showing a specific construction of the embodiment shown in FIG. 1. As shown in FIG. 4, the logical operation circuit 1 in FIG. 1 is formed of a partial product generating circuit 11 and an encode circuit 12. The partial product generating circuit 11 receives the digital signals R1 and R0 of 2 bits as the multiplier, and outputs five partial products S1-S5. The encode circuit 12 uses the partial products S1-S5 supplied from the partial product generating circuit 11 as parameters, and encodes the decoded signals A0-A3 supplied from the decode circuit 2 to output the digital signals Y3-Y0 of 4 bits forming the multiplication result.

Now, logical operations of the partial product generating circuit 11 and the encode circuit 12 shown in FIG. 4 will be described. The expressions (1)-(4) described before can be expressed as follows:

$$Y3 = (R1 \cdot R0) \cdot A3 \quad (5)$$
$$= S5 \cdot A3$$

$$Y2 = (R1 \cdot /R0) \cdot A3 + R1 \cdot A2 \quad (6)$$
$$= S4 \cdot A3 + S3 \cdot A2$$

$$Y1 = (R1*R0) \cdot R0 \cdot A2 + R1 \cdot A1 \quad (7)$$
$$= S2 \cdot A3 + S1 \cdot A2 + S3 \cdot A1$$

$$Y0 = R0 \cdot A3 + R0 \cdot A1 \quad (8)$$
$$= S1 \cdot A3 + S1 \cdot A1$$

Figure 5:
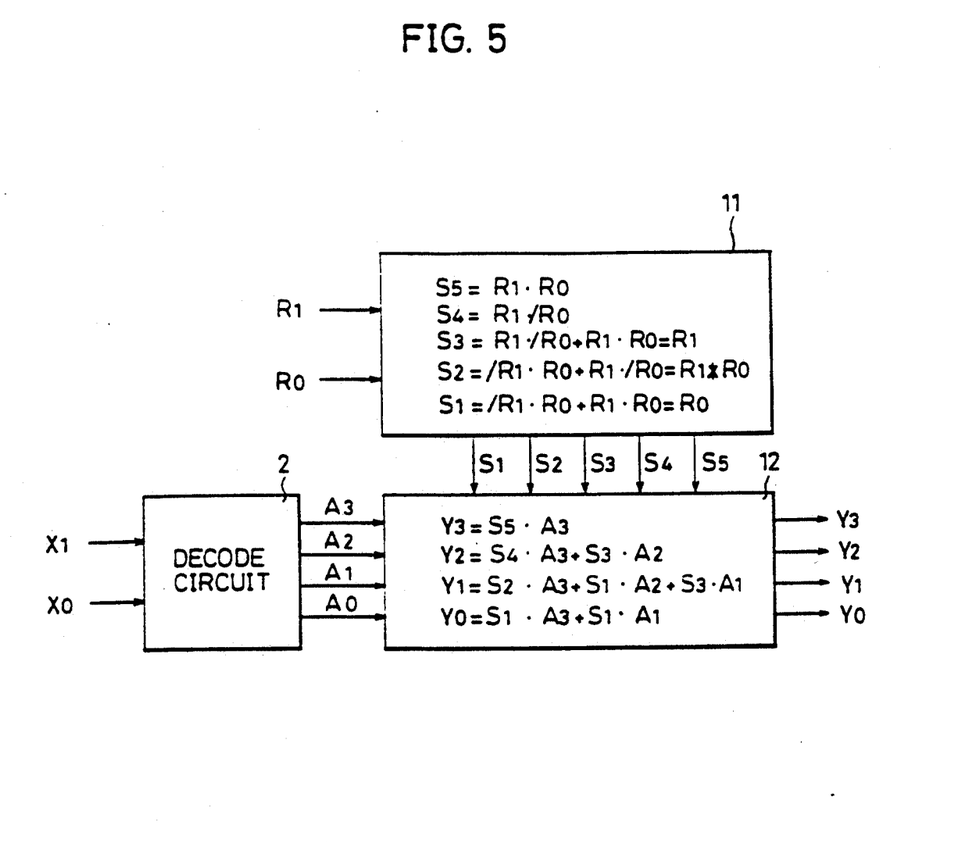
FIG. 5 shows operation contents of a partial product generating circuit and an encode circuit 12 in an embodiment shown in FIG. 4.

In the above expressions (5)–(8), S5-S1 have relationships of S5=R1·R0, S4=R1·/R0, S3=R1, S2=R1*R0 and S1=R0. These values S5-S1 are called as partial products, and can be obtained only from the digital signals R1 and R0 forming multipliers. The partial product generating circuit 11 shown in FIG. 4 provides the respective partial products, as shown in FIG. 5. The logical values of the respective bit signals of the digital signals Y3-Y0 forming the multiplication result can be independently obtained by the logical operations of the partial products S1-S5 and the decoded signals A0-A3, respectively. The encode circuit 12 shown in FIG. 4 performs independent operations to obtain the logical values of the respective bits of the multiplication result based on the partial products S1-S5 and the decoded signals A0-A3, as shown in FIG. 5.

Figure 6:
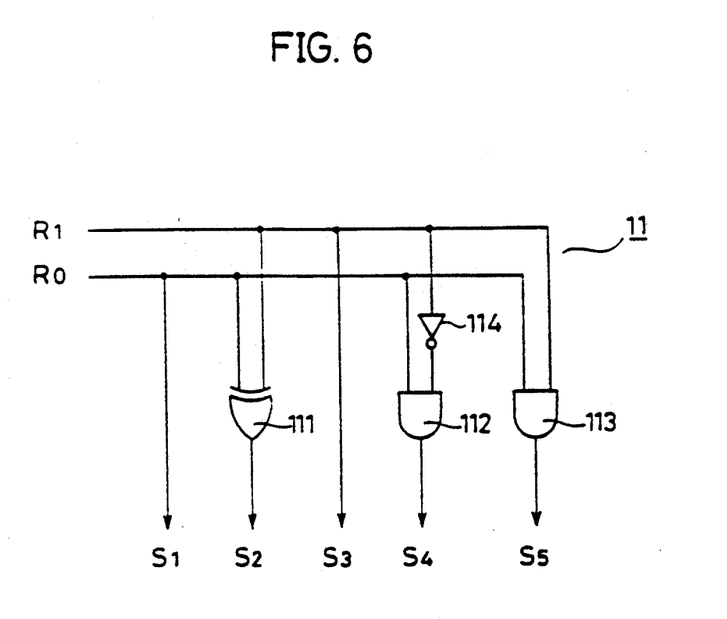
FIG. 6 is a logic gate diagram showing an example of a construction of a partial product generating circuit 11 in FIG. 4.

FIG. 6 is a logic gate diagram showing an example of a construction of the partial product generating circuit 11 shown in FIG. 4. In FIG. 6, the partial product generating circuit 11 comprises an exclusive-OR gate 111, AND gates 112 and 113 and an inverter 114. As to the digital signals R1 and R0 of 2 bits forming the multiplier, the bit signal R0 is output as it is as the partial product S1, and is supplied to one input of each of the exclusive-OR gate 111 and the AND gates 112 and 113. The other bit signal R1 is supplied to the other input of each of the exclusive-OR gate 111 and the AND gate 113, and is also supplied to the other input of the AND gate 112 after being inverted by the inverter 114. The bit signal R1 is output as the partial product S3, as it is. An output of the exclusive-OR gate 111 forms the partial product S2, an output of the AND gate 112 forms the partial product S4, and an output of the AND gate 113 forms the partial product S5.

Figure 7:
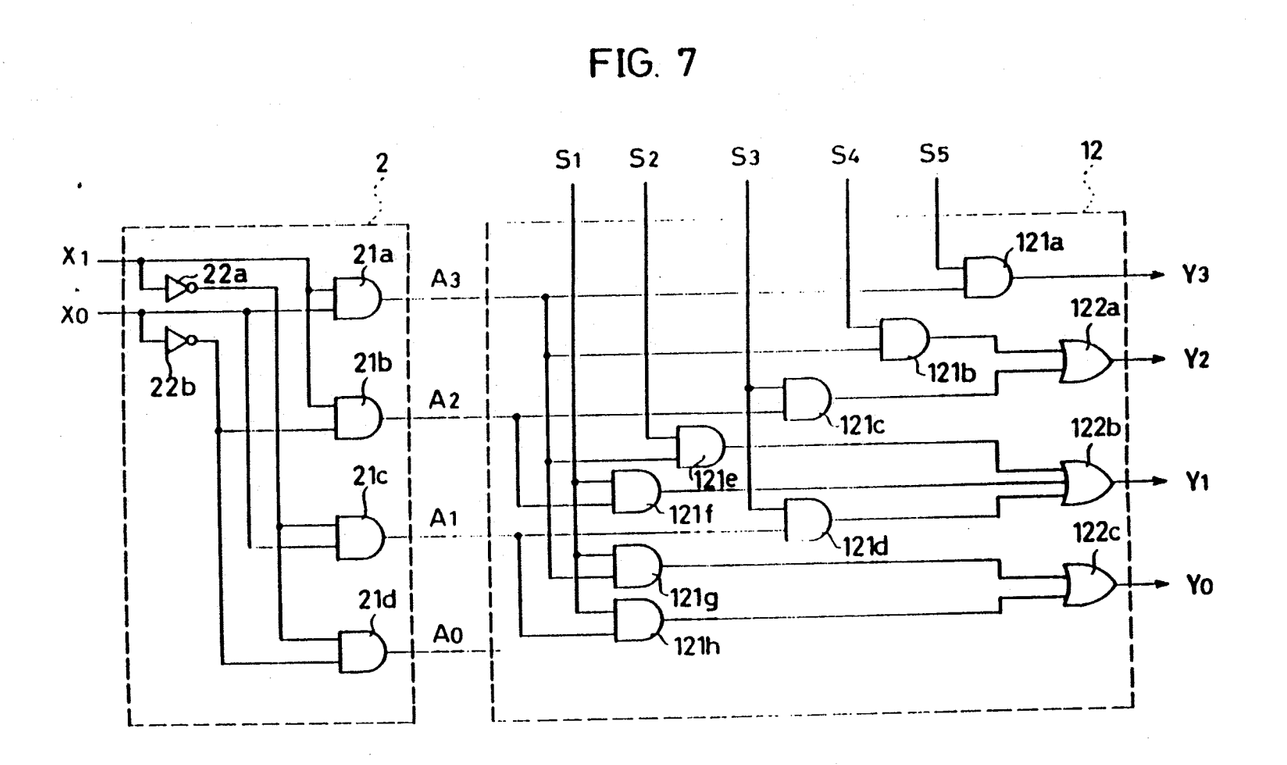
FIG. 7 is a logic gate diagram showing an example of a construction of a decode circuit 2 and an encode circuit 12 in an embodiment shown in FIG. 4.
Figure 8A:
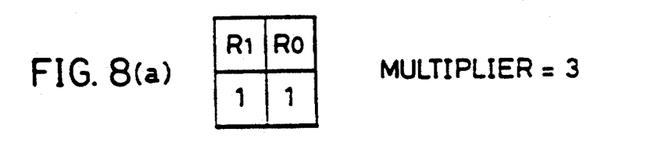
Figure 8B:
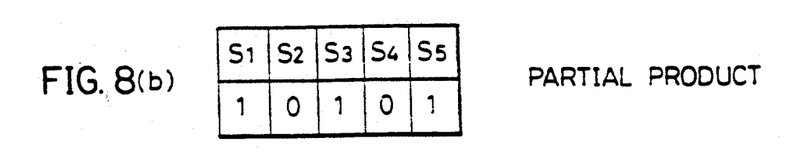
Figure 8C:
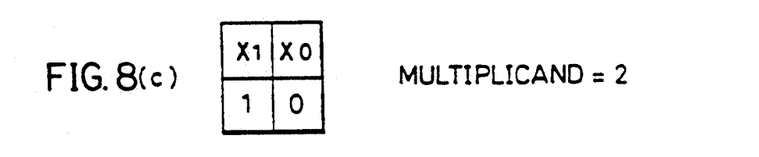
Figure 8D:
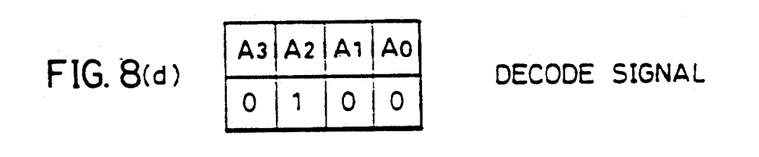
Figure 8E:
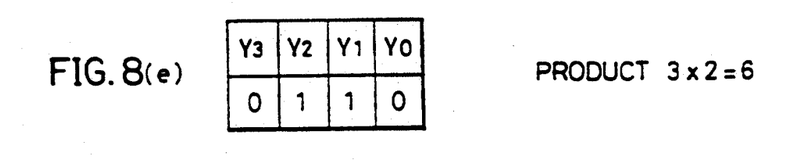

FIG. 7 is a logic gate diagram showing an example of a construction of the decode circuit 2 and the encode circuit 12 in FIG. 4. In the figure, the decode circuit 2 comprises AND gates 21a-21d and inverters 22a and 22b. As to the digital signals X1 and X0 of 2 bits forming the multiplicand, the bit signal X1 is supplied to one input of each of the AND gates 21a and 21b, and is supplied to one input of each of the AND gates 21c and 21d after being inverted by the inverter 22a. The other bit signal X0 is supplied to the other input of each of the AND gates 21a and 21c, and is also supplied to the other input of the AND gates 21b and 21d after being inverted by the inverter 22b. The AND gates 21, 21b, 21c and 21d output the decoded signals A3, A2, A1 and A0, respectively.

In FIG. 7, the encode circuit 12 comprises AND gates 121a-121h and OR gates 122a-122c. The partial product S5 is supplied to one input of the AND gate 121a. The partial product S4 is supplied to one input of the AND gate 121b. The partial product S3 is supplied to one input of each of the AND gates 121c and 121d. The partial product S2 is supplied to one input of the AND gate 121e. The partial product S1 is supplied to one input of each of the AND gates 121f-121h. The decoded signal A3 is supplied to the other input of each of the AND gates 121a, 121b, 121e and 121g. The decoded signal A2 is supplied to the other input of each of the AND gates 121c and 121f. The decoded signal A1 is supplied to the other input of each of the AND gates 121d and 121h. As can be seen from the expressions (5)–(8) described above, the decoded signal A0 is not required in operations of the respective bit signals Y3-Y0 in the digital signals forming the multiplication result. Therefore, the decoded signal A0 is not applied to any logic gate. The OR gate 122a receives at one input an output of the AND gate 121b, and also receives at the other input an output of the AND gate 121c. The OR gate 122b has three inputs, i.e., first, second and third inputs, to which outputs of the AND gate 121e, 121f and 121d are supplied, respectively. The OR gate receives at one input an output of the AND gate 121g, and receives at the other input an output of the AND gate 121h. The AND gate 121a outputs the bit signal Y3, and the OR gate 122a outputs the bit signal Y2. The OR gate 122b outputs the bit signal Y1, and the OR gate 122c outputs the bit signal Y0.

FIGS. 8(a)-8(e) show, as an example, steps of multiplication in the embodiment shown in FIG. 4. An operation of the embodiment shown, in FIG. 4 will be described below with made particularly with respect to a case that a value of the multiplier is 3 and a value of the multiplicand is 2. The digital signal of 2 bits as the multiplier is set as R1=1 (e.g., at the high level) and R0=1 (e.g., at the high level). Therefore, the partial products S1-S5 obtained by the partial product generating circuit 11 are set as S1=S3=S5=1 (e.g., at the high level) and S2=S4=0 (e.g., at the low level). Digital signals of 2 bits as the multiplicand is set as X1=1 (e.g., at the high level) and X0=0 (e.g., at the low level). Therefore, the decoded signals A0-A4 obtained by the decode circuit 2 are set as A2=1 (e.g., high level) and A0=A1-=A3=0 (e.g., low level). The encode circuit 12 shown in FIG. 4 performs gate control of the decoded signals A0-A3, using the partial products S1-S5 as parameters, and outputs the digital signals Y3-Y0 of 4 bits, i.e., Y1=Y2=1 (e.g., high level) and Y0=Y3=0 (e.g., low level). Consequently, the product is 6, and an operation of 3×2 has been conducted.

As described above, since the digital multiplier shown in FIGS. 4–7 is constructed without using a full adder, there is no carry delay, and a maximum propagation path for signals is determined only by logic gates in the partial product generating circuit 11 and the encode circuit 12. Therefore, the digital multiplier of the embodiment shown in FIGS. 4–8(e) has the maximum propagation path shorter than that in the conventional digital multiplier, and thus can perform high-speed multiplication of the digital signals. In the embodiment shown in FIGS. 4–8(e), since increase of the bit number of the input digital signal does not increase a number of the logic gates located in one signal propagation path, the maximum propagation path for the signals does not change, which allows extremely high-speed multiplication. Further, in such a case that the digital signal forming the multiplier is supplied as a fixed value, the partial product generating circuit 11 performs precalculation of the partial product, so that the length of the maximum propagation path is further reduced, which allows further increase of the operation speed of the digital multiplier.

In the embodiment shown in FIGS. 4-7, even if the bit number of the input digital signal increase, the number of the logic gates increases only proportionally to the bit number, so that an increasing rate of the circuit area can be small, as compared with the conventional digital multiplier, using a ROM table, in which the number of the logic gates increases in a form of an exponential function.

The partial product generating circuit 11 shown in FIG. 4 may use a ROM table, instead of the logic gate circuit shown in FIG. 6.

According to the invention, as described hereinabove, since the logical value of each bit of the third signal as the multiplication result is independently operated, the logical operation of each bit can be conducted without waiting termination of the logical operations of other bits, so that the operation speed of the digital multiplier can be remarkably increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital multiplier in which a coded first digital signal of multiple bits is multiplied by a coded second digital signal of multiple bits to output a coded third digital signal of multiple bits as a multiplication result without a full adder, comprising:
   decoding means for decoding said second digital signal; and
   logical operation means for performing independent operations for obtaining logical values of respective bits of said third digital signal, based on said first digital signal and an output of said decoding means.

2. A digital multiplier according to claim 1, wherein said logical operation means includes:
   partial product operation means for operating multiple kinds of partial products based on said first digital signal; and
   encoding means for encoding an output of said decoding means, using said multiple kinds of partial products supplied from said partial product operating means as parameters, to output said third digital signal.

3. A digital multiplier according to claim 2, wherein said encoding means includes a plurality of logic gates for gating said output of said decoding means in response to said multiple kinds of partial products.

4. A digital multiplier according to claim 3 wherein said second digital signal has n bits and is decoded by said decoding means to output $2^n$ decoded signals.

5. A digital multiplier according to claim 4 wherein said decoding means selectively sets one of said $2^n$ decoded signals at a first logical state and sets the remaining decoded signals at a second logical state.

* * * * *